United States Patent
Utsuki et al.

(10) Patent No.: US 8,371,584 B2
(45) Date of Patent: Feb. 12, 2013

(54) INDICATION POSITION CALCULATION MARK UNIT

(75) Inventors: Kazuo Utsuki, Sagamihara (JP); Takashi Satsukawa, Yokohama (JP); Takehiro Shimizu, Tokyo (JP); Shigemasa Saito, Yokohama (JP); Kanji Nakane, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 1219 days.

(21) Appl. No.: 12/190,063

(22) Filed: Aug. 12, 2008

(65) Prior Publication Data

US 2009/0054162 A1    Feb. 26, 2009

(30) Foreign Application Priority Data

Aug. 22, 2007  (JP) ................................. 2007-215437

(51) Int. Cl.
A63F 13/00 (2006.01)

(52) U.S. Cl. ................. 273/309; 273/143 E; 273/348.4; 273/348.5; 273/365; 273/369; 463/39; 463/46; 463/47; 248/406.2; 248/648; 248/685; 248/686; 248/687

(58) Field of Classification Search ........... 463/46, 463/47, 39; 273/101.2, 102.5, 313, 85, 309, 273/369, 348.4, 348.5, 365, 143 E; 248/406.2, 248/648, 685, 686, 687, 693

See application file for complete search history.

(56) References Cited

U.S. PATENT DOCUMENTS

| 4,285,523 A * | 8/1981 | Lemelson ........................ 463/5 |
| 6,146,278 A | 11/2000 | Kobayashi |
| 2003/0098852 A1 | 5/2003 | Huang et al. |
| 2007/0049374 A1 | 3/2007 | Ikeda et al. |

FOREIGN PATENT DOCUMENTS

| EP | 1 962 103 A1 | 8/2008 |
| EP | 1 962 104 A1 | 8/2008 |
| JP | A-10-249065 | 9/1998 |
| JP | A-11-178702 | 7/1999 |
| JP | B2-2961097 | 7/1999 |
| JP | A-2005-165700 | 6/2005 |

* cited by examiner

Primary Examiner — Sunit Pandya
(74) Attorney, Agent, or Firm — Oliff & Berridge, PLC

(57) ABSTRACT

A mark unit includes a holding section that is disposed at the top of a display section so that a light-emitting section is positioned on a side of a display screen of the display section and a weight section is positioned on a side opposite to the display screen to hold the light-emitting section on the side of the display screen that intersects a horizontal plane.

12 Claims, 11 Drawing Sheets

US 8,371,584 B2

INDICATION POSITION CALCULATION MARK UNIT

Japanese Patent Application No. 2007-215437, filed on Aug. 22, 2007, is hereby incorporated by reference in its entirety.

BACKGROUND OF THE INVENTION

The present invention relates to an indication position calculation mark unit.

An indication position calculation system that calculates an indication position of an indicator on an indication surface (e.g., monitor or screen), such as a shooting game system using a gun-type controller or a presentation system using a pointing device, has been known. In such an indication position calculation system, two indication position calculation marks (e.g., infrared light sources) are disposed near the indication surface. The marks are imaged using a light-receiving sensor provided on the end of the indicator, and the indication position of the indicator on the indication surface is calculated based on the positions of the marks in the image. Japanese Patent No. 2961097 discloses such technology, for example.

In such an indication position calculation system, the marks must be disposed near the indication surface. When forming an indication position calculation system using a general-purpose monitor, screen, or the like, the marks are placed at the top of the monitor, screen, or the like. However, a flat-screen monitor (e.g., liquid crystal monitor) generally does not have an upward surface on which the marks can be placed. Therefore, the marks may be attached near the indication surface using a double-sided tape. However, this mark attachment work is troublesome. Moreover, an adhesive mark may remain on the monitor, screen, or the like. A clip may be attached to the mark, and the mark may be clipped on the monitor, screen, or the like. However, a monitor generally does not have a portion on which the mark can be clipped.

SUMMARY

According to a first aspect of the invention, there is provided an indication position calculation mark unit disposed on a placement target that has a predetermined positional relationship with an indication surface in order to calculate an indication position of an indicator on the indication surface, the mark unit comprising:

a mark section that allows light to travel in a predetermined direction;

a weight section that has a weight corresponding to the weight of the mark section; and a holding section that has a given length, flexibility, and coefficient of friction, and connects the mark section and the weight section, the holding section holding the mark section on a surface parallel to the indication surface by means of a frictional force between the holding section and the placement target based on the weight of the mark section and the weight of the weight section.

According to a second aspect of the invention, there is provided an indication position calculation mark unit for calculating an indication position of an indicator on an indication surface, the mark unit comprising:

a mark section that allows light to travel in a predetermined direction; and a holding section that is connected to the mark section and has a given length, flexibility, and coefficient of friction.

DETAILED DESCRIPTION OF THE EMBODIMENT

Figure 1:
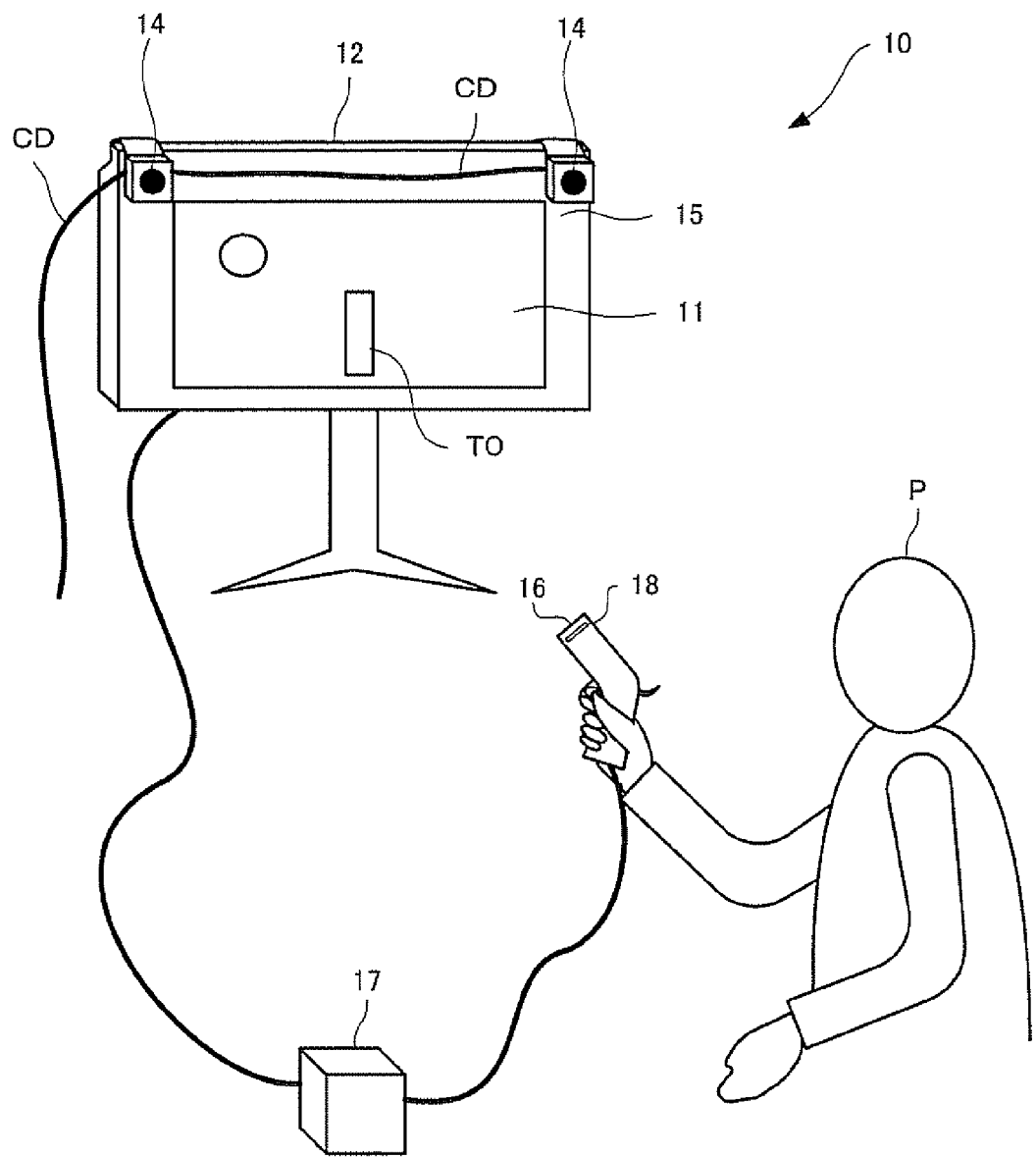
FIG. 1 shows an example of a schematic appearance of a system according to a first embodiment.

The invention may provide a mark unit that allows a mark to be held near an indication surface without bonding the mark to a monitor, a screen, or the like or using a clip.

(1) According to one embodiment of the invention, there is provided an indication position calculation mark unit disposed on a placement target that has a predetermined positional relationship with an indication surface in order to calculate an indication position of an indicator on the indication surface, the mark unit comprising:

a mark section that allows light to travel in a predetermined direction;

a weight section that has a weight corresponding to the weight of the mark section; and a holding section that has a given length, flexibility, and coefficient of friction, and connects the mark section and the weight section, the holding section holding the mark section on a surface parallel to the indication surface by means of a frictional force between the holding section and the placement target based on the weight of the mark section and the weight of the weight section.

In this embodiment, the holding section may have a length and flexibility that ensure that the holding section is deformed corresponding to the shape of the placement target by the weight of the mark section and the weight of the weight section, and may have a coefficient of friction that ensures that the holding section is stably disposed on the placement target. The holding section may be a belt-shaped member formed of a silicone resin, for example.

According to this embodiment, since the holding section is disposed at the top of the placement target (e.g., flat-screen monitor or screen) so that the mark section is positioned on the indication surface of the placement target and the weight section is positioned on the side of the placement target opposite to the indication surface, the mark section can be held on the indication surface that intersects the horizontal plane.

Since the holding section according to this embodiment has a given length and flexibility, the holding section is deformed corresponding to the shape of the placement target by the weight of the mark section and the weight of the weight section. Therefore, a contact area between the holding section and the placement target can be provided regardless of the shape of the top of the placement target. Since the holding section according to this embodiment has a predetermined coefficient of friction, the holding section can be stably disposed on the placement target by the contact area obtained as a result of deformation of the holding section and a frictional force that occurs corresponding to the weight of the mark section and the weight of the weight section.

According to this embodiment, even if the placement target does not have a flat top surface on which the mark section can be placed, the mark section can be held on the indication surface that intersects the horizontal plane without bonding the mark section to the placement target.

(2) In this mark unit, the holding section may connect the mark section and the weight section so that the position of at least one of the mark section and the weight section with respect to the holding section can be changed.

According to this embodiment, the mark unit can be stably disposed on the placement target having various types of shape by changing the position of at least one of the mark section and the weight section with respect to the holding section corresponding to the shape of the placement target, whereby the mark section can be held on the indication surface.

(3) In this mark unit, the holding section may connect the mark section and the weight section so that the direction of the holding section with respect to the mark section can be changed.

According to this embodiment, the mark unit can be stably disposed on the placement target having various types of shape by changing the direction of the holding section with respect to the mark section corresponding to the shape of the placement target, whereby the mark section can be held on the indication surface.

(4) In this mark unit, the length of the holding section may be adjusted.

According to this embodiment, the mark unit can be stably disposed on the placement target having various types of shape by changing the length of the holding section corresponding to the shape of the placement target, whereby the mark section can be held on the indication surface.

(5) In this mark unit, a plurality of the weight sections may be connected to the holding section.

According to this embodiment, the mark unit can be stably disposed on the placement target having various types of shape by changing the length of the holding section corresponding to the shape of the placement target, whereby the mark section can be held on the indication surface.

(6) In this mark unit, the mark section may include:
a back side facing in a direction opposite to the travel direction of the light;
a rotation shaft being provided at the top of the back side and parallel to the back side; and
a rotation section having a rotation side that can be rotated so that a rotation angle around the rotation shaft with respect to the back side can be adjusted, and
the holding section may connect the rotation section and the weight section.

According to this embodiment, since the back side of the mark section is used as a contact surface with a side (e.g., the indication surface or a frame of the indication surface) parallel to the indication surface of the placement target, the direction of the mark section can be stabilized while causing the light travel direction to coincide with a direction that intersects the indication surface. According to this embodiment, since the rotation side of the mark section is used as a contact surface with a side (e.g., the upper side of placement target) that intersects the indication surface of the placement target, the direction of the mark section can be further stabilized. According to this embodiment, since the back side and the rotation side of the mark section can be caused to come in contact with a plurality of surfaces or sides of the placement target having various types of shape by adjusting the angle of the rotation side with respect to the back side corresponding to the shape of the placement target, the direction of the mark section can be further stabilized with respect to the placement target having various types of shape.

(7) In this mark unit, the mark section may include:
a back side facing in a direction opposite to the travel direction of the light;
a pull-out opening provided in the back side, a cord that supplies power to the mark section being pulled out from the pull-out opening; and
a cord groove provided in the back side in rightward and leftward directions from the pull-out opening, the cord pulled out from the pull-out opening being buried in the back side along the cord groove.

According to this embodiment, since the back side can be caused to adhere to a side (e.g., the indication surface or a frame of the indication surface) parallel to the indication surface of the placement target by burying the cord in the back side along the cord groove, the direction of the mark section can be stabilized. According to this embodiment, since the cord groove is formed in the rightward and leftward directions from the pull-out opening, the cord can be provided in the rightward and leftward directions along the back side. For example, when the mark unit is disposed on the left with respect to the indication surface, it is preferable to provide the cord in the leftward direction so that the cord does not overlap the indication surface. When the mark unit is disposed on the right with respect to the indication surface, it is preferable to provide the cord in the rightward direction so that the cord does not overlap the indication surface. According to this embodiment, since the cord is provided in the rightward or leftward direction corresponding to the position of the mark unit with respect to the indication surface, the cord does not overlap the indication surface regardless of the position of the mark unit with respect to the indication surface.

(8) According to one embodiment of the invention, there is provided an indication position calculation mark unit for calculating an indication position of an indicator on an indication surface, the mark unit comprising:
a mark section that allows light to travel in a predetermined direction; and
a holding section that is connected to the mark section and has a given length, flexibility, and coefficient of friction.

According to this embodiment, since the holding section is disposed at the top of the placement target (e.g., flat-screen monitor or screen) so that the mark section is positioned on the indication surface of the placement target, the mark section can be held on the indication surface that intersects the horizontal plane.

Since the holding section according to this embodiment has a given length and flexibility, the holding section is deformed corresponding to the shape of the placement target by the weight of the mark section and the weight of the holding section. Therefore, a contact area between the holding section and the placement target can be provided regardless of the shape of the top of the placement target. Since the holding section according to this embodiment has a predetermined coefficient of friction, the holding section can be stably disposed on the placement target by the contact area obtained as a result of deformation of the holding section and a frictional force that occurs corresponding to the weight of the mark section and the weight of the holding section.

According to this embodiment, even if the placement target does not have a flat top surface on which the mark section can be placed, the mark section can be held on the indication surface that intersects the horizontal plane without bonding the mark section to the placement target.

Some embodiments of the invention will be described below. Note that the embodiments described below do not in any way limit the scope of the invention laid out in the claims herein. In addition, not all of the elements of the embodiments described below should be taken as essential requirements of the invention.

I. Outline of System

FIG. 1 schematically shows a game system 10 to which an indication position calculation system according to one embodiment of the invention is applied. The game system 10 according to this embodiment includes a display section 12 (e.g., general-purpose liquid crystal monitor) (i.e., placement target) that displays a game image such as a target object TO on a display screen 11 (i.e., indication surface), two light-emitting units 14 (i.e., mark units) that are provided at the top of the display section 12 and include a light source such as an infrared LED, a gun-type controller 16 (indicator) that is held by a player P so that its position and direction can be arbitrarily changed and is used to indicate an arbitrary position on the display screen 11, and a game device 17 that performs a game process and the like.

The light-emitting units 14 according to this embodiment are provided at the top of the display section 12 at a predetermined interval so that the front side provided with the light source faces in the same direction as the display screen 11 (i.e., the direction toward the player). In this embodiment, a portion of the light-emitting unit 14 provided with the light source is held on a frame surface 15 that is a side parallel to the display screen 11. Each of the light-emitting units 14 allows infrared light from the light source to travel in the forward direction (i.e., the direction toward the player P). As shown in FIG. 1, light-emitting sections LM of the right and left light-emitting units 14 according to this embodiment are connected via a cord CD for supplying power to the light-emitting sections LM.

A light-receiving sensor (imaging sensor) 18 (e.g., CMOS sensor) (i.e., light-receiving section or imaging section) is provided on the end of the controller 16. The light-receiving sensor 18 receives light that enters the light-receiving sensor 18 along the direction in which the end of the controller 16 is directed, and acquires the light as an image.

The game system 10 calculates information relating to the indication position of the controller 16 on the display screen 11 based on light reception position information relating to the infrared light from the light-emitting units 14 received by the light-receiving sensor 18, and reference position information set in advance. The game system 10 determines whether or not the indication position of the controller 16 when a trigger of the controller 16 has been pulled coincides with the position of the target object TO displayed on the display screen 11, and performs a game process such as an image display control process or a score calculation process.

Figure 2:
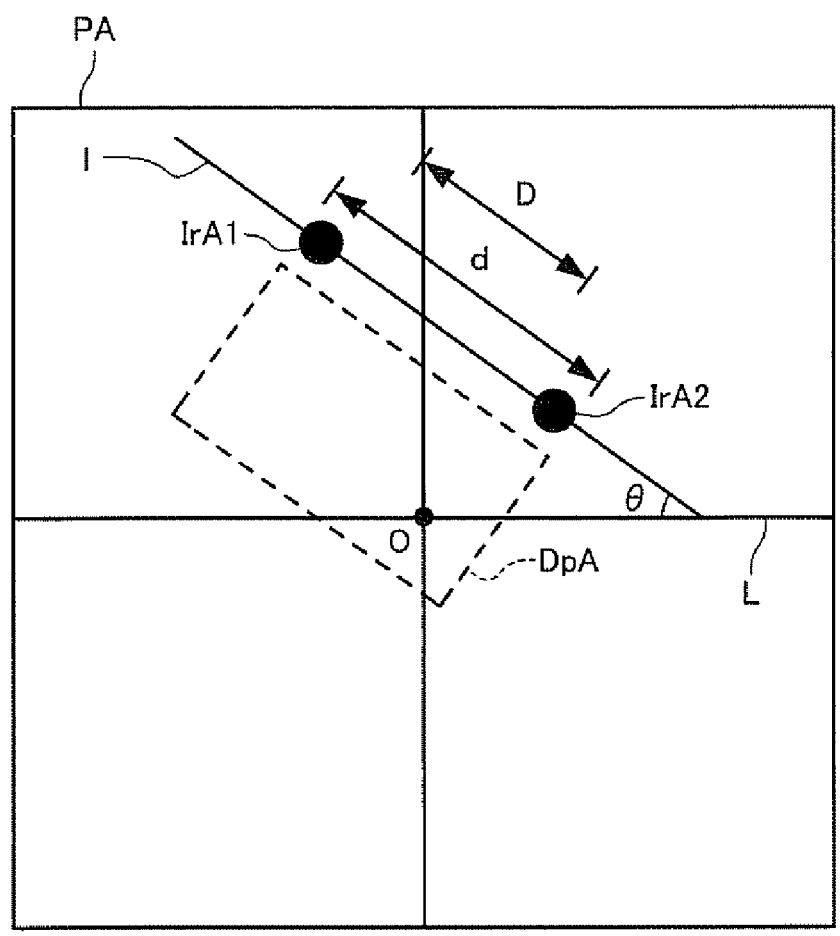
FIG. 2 is a diagram illustrative of an example of a method according to the first embodiment.

FIG. 2 is a diagram illustrative of a method of calculating the information relating to the indication position of the controller 16 on the display screen 11. In this embodiment, light received by the light-receiving sensor 18 is imaged as image data PA of which one pixel corresponds to one light-receiving element, as shown in FIG. 2. In this embodiment, the image data PA is updated every 1/60th of a second corresponding to the position and the direction of the controller 16. In this embodiment, the information relating to the indication position of the controller 16 on the display screen 11 is calculated by calculating a display screen area DpA that is an area corresponding to the display screen 11 in the image data PA based on infrared light source areas IrA1 and IrA2 that are areas obtained by imaging the infrared light from the light-emitting units 14. In this embodiment, an origin O that is the center point of the image data PA is determined to be the point indicated by the controller 16, and the information relating to the indication position of the controller 16 on the display screen 11 is calculated from the positional relationship between the origin O and the display screen area DpA.

In the example shown in FIG. 2, the infrared light source areas IrA1 and IrA2 are formed above the center of the image data PA to some extent in a state in which a straight line 1 that connects the infrared light source areas IrA1 and IrA2 is rotated clockwise by theta degrees with respect to a reference line L (X axis) of the image data PA. In the example shown in FIG. 2, the origin O corresponds to a predetermined position on the lower right of the display screen area DpA so that the coordinates of the indication position of the controller 16 on the display screen 11 can be calculated. The rotation angle of the controller 16 around the indication direction axis with respect to the display screen 11 can be calculated from the rotation angle theta of the straight line 1 that connects the infrared light source areas IrA1 and IrA2 with respect to the reference line L. The distance between the controller 16 and the display screen 11 in the example shown in FIG. 2 can be calculated based on the ratio of a reference distance D between the infrared light source areas IrA1 and IrA2 when the controller 16 is positioned at a predetermined distance from the display screen 11 and a distance d between the infrared light source areas IrA1 and IrA2 in the example shown in FIG. 2 by setting the reference distance D in advance.

According to this embodiment, the information relating to the indication position of the controller 16 on the display screen 11 and the like can be calculated corresponding to the position and the direction of the controller 16 even if the player P has changed the position and the direction of the controller 16 while holding the controller 16 as shown in FIG. 1.

In the example shown in FIG. 1, the game device 17 and the controller 16 are connected via a cord. Note that information may be exchanged between the game device 17 and the controller 16 via wireless communication. The arrangement position of the light-emitting unit 14 is not limited to the top of the display section. The light-emitting unit 14 may be provided at an arbitrary position (e.g., bottom or side). Specifically, the light-emitting unit 14 may be provided to have a given positional relationship with the display section 12 within a range in which the light-receiving sensor 18 can receive light when the controller 16 is directed toward the display screen 11.

2. First Embodiment

The details of a light-emitting unit 14 according to a first embodiment are described below.

Figure 3B:
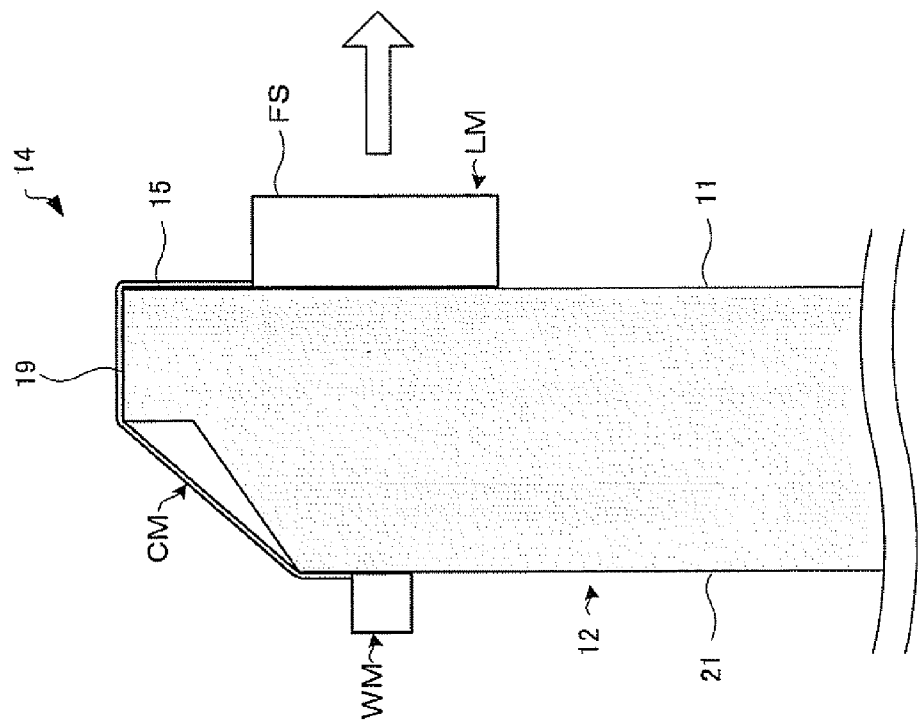
FIGS. 3A and 3B show the appearance and a placement example of a light-emitting unit according to the first embodiment.
Figure 3A:
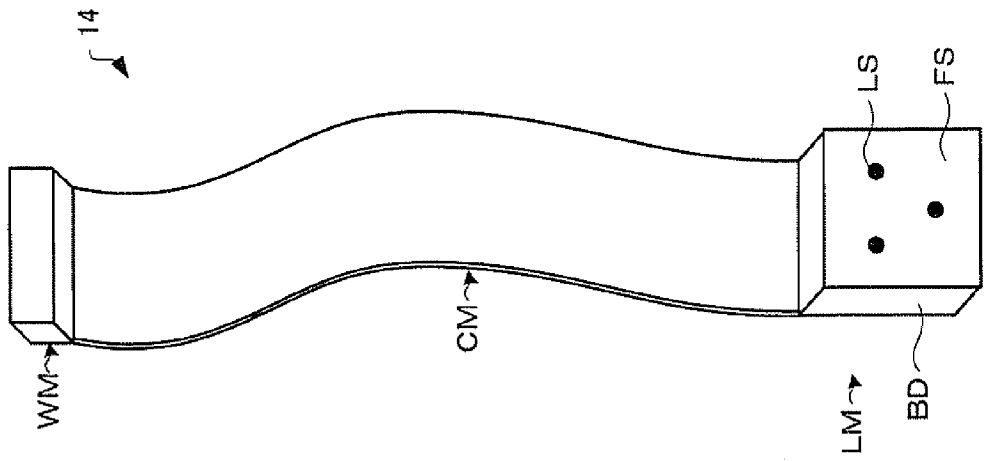

FIG. 3A is a perspective view showing the light-emitting unit 14 according to this embodiment. As shown in FIG. 3A, the light-emitting unit 14 according to this embodiment includes a light-emitting section LM (i.e., mark section), a weight section WM, and a holding section CM.

The light-emitting section LM includes a rectangular parallelepiped housing BD formed of a plastic. A front side FS of the housing BD is provided with three light sources LS that emit light through the front side FS. In this embodiment, the light sources LS are formed using an LED that outputs infrared light, and are disposed so that the light sources LS correspond to the vertices of an inverted triangle.

The weight section WM has a weight corresponding to the weight of the light-emitting section LM. In this embodiment, the weight section WM and the light-emitting section LM weigh about 50 g, and are formed to have almost the same weight.

The holding section CM has a given length, flexibility, and coefficient of friction, and connects the light-emitting section LM and the weight section WM. In this embodiment, the holding section CM is a belt-shaped member that is formed of a silicone resin and has a length of about 30 cm, a width of about 4 cm, and a thickness of about 1 mm. The holding section CM has flexibility that ensures that the holding section CM is bent by application of a small amount of force, and has a coefficient of friction that ensures that the holding section CM slides to only a small extent on a plastic or a synthetic resin that forms a housing of the display section 12.

FIG. 3B is a side view showing a state in which the light-emitting unit 14 according to this embodiment is disposed at the top of the display section 12 (gray portion in FIG. 3B). As shown in FIG. 3B, when the display section 12 is a flat-screen liquid crystal monitor or the like, a flat upper side 19 (i.e., upward surface) is generally so narrow that the light-emitting section LM cannot be placed on the upper side 19. In order to hold the light-emitting section LM on the frame surface 15 (i.e., a side parallel to the display screen 11), it is necessary to bond the light-emitting section LM to the frame surface 15. Since the light-emitting unit 14 according to this embodiment includes the weight section WM and the holding section CM in addition to the light-emitting section LM, the light-emitting unit 14 can be disposed on the display section 12 so that the holding section CM comes in contact with the top of the display section 12 including the upper side 19 of the display section 12, the light-emitting section LM is positioned on the display screen 11 of the display section 12, and the weight section WM is positioned on a back side 21 of the display section 12 opposite to the display screen 11, as shown in FIG. 3B.

The holding section CM according to this embodiment has a length and flexibility that ensure that the holding section CM is deformed corresponding to the shape of the display section 12 by the weight of the light-emitting section LM and the weight of the weight section WM. Therefore, when the light-emitting unit 14 is placed on the display section 12 in the above-described way, the light-emitting section LM is suspended in front of the display screen 11 of the display section 12, and the weight section WM is suspended in front of the back side 21 of the display section 12, as shown in FIG. 3B. Since the weight of the light-emitting section LM is almost the same as the weight of the weight section WM, the light-emitting section LM and the weight section WM pull the holding section CM downward with almost the same force. According to this embodiment, the light-emitting unit 14 can thus be disposed on the display section 12 in a stationary state.

Since the holding section CM is deformed corresponding to the shape of the display section 12 (see FIG. 3B), a contact area with the display section 12 can be obtained. Since the holding section CM according to this embodiment has a coefficient of friction that ensures that the holding section CM slides on the display section 12 to only a small extent, a frictional force corresponding to the weight of the light-emitting section LM and the weight of the weight section WM occurs in the contact area with the display section 12 obtained by deformation of the holding section CM. Specifically, the light-emitting unit 14 can be stably disposed on the display section 12 by the frictional force that prevents the light-emitting section LM from sliding downward along the display screen 11 of the display section 12 or the frictional force that prevents the weight section WM from sliding downward along the back side 21 of the display section 12.

According to this embodiment, even if the display section 12 does not have a flat top surface on which the light-emitting section LM can be placed (e.g., flat-screen liquid crystal monitor or screen), the light-emitting section LM can be held on the display screen 11 (e.g., frame surface 15) that intersects the horizontal plane (see FIG. 3B) without bonding the light-emitting section LM to the display section 12. Therefore, the light-emitting section LM can emit light through the front side FS of the light-emitting section LM in the direction that intersects the display screen 11 (i.e., the direction toward the player) (indicated by an arrow in FIG. 3B) so that the controller 16 can receive the emitted light.

3. Second Embodiment

The details of a light-emitting unit 14 according to a second embodiment are described below.

Figure 4B:
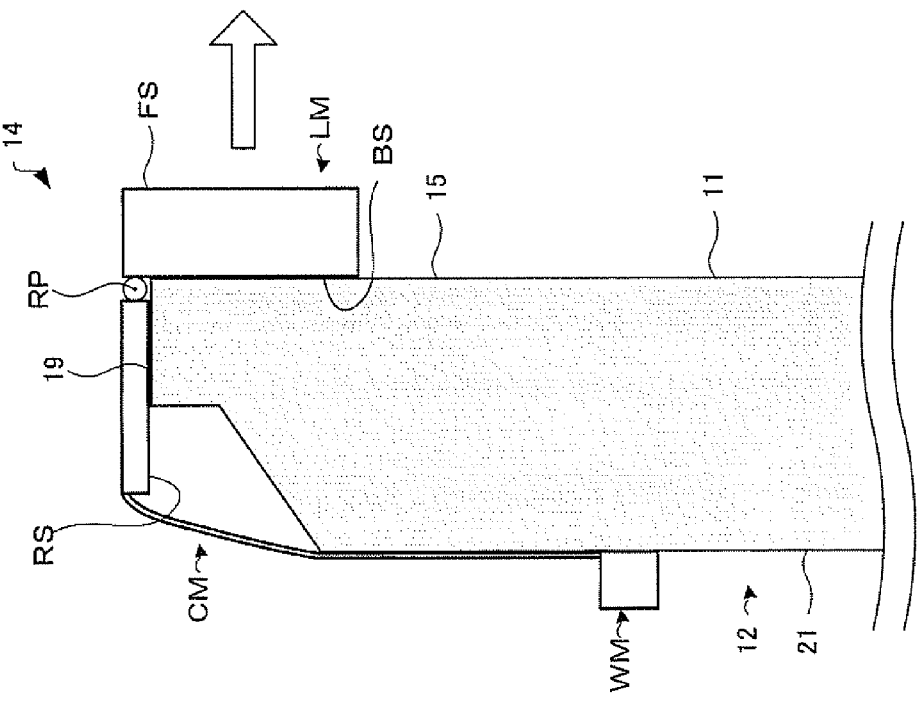
FIGS. 4A and 4B show the appearance and a placement example of a light-emitting unit according to a second embodiment.
Figure 4A:
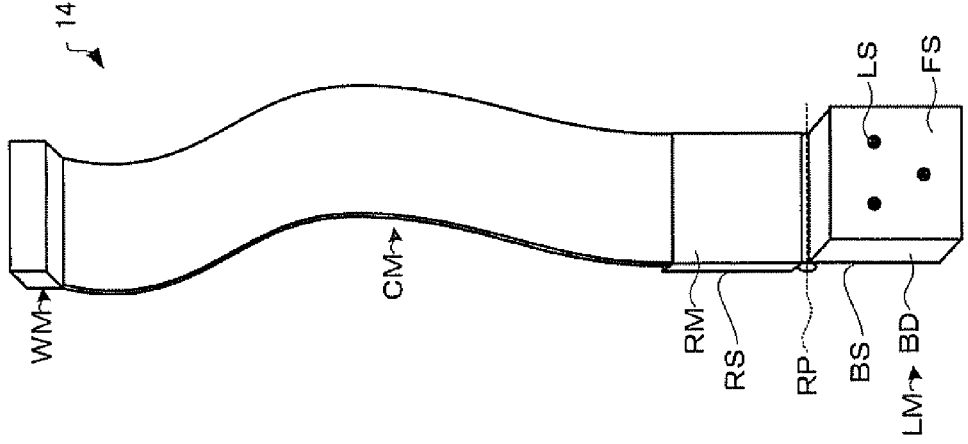

FIG. 4A is a perspective view showing the light-emitting unit 14 according to the second embodiment. As shown in FIG. 4A, the light-emitting unit 14 according to this embodiment has almost the same configuration as that of the light-emitting unit 14 according to the first embodiment. In this embodiment, the light-emitting section LM further includes a rotation shaft RP and a rotation section RM. In this embodiment, the holding section CM connects the rotation section RM of the light-emitting section LM with the weight section WM.

The rotation shaft RP is provided in parallel with a back side BS (i.e., the side of the housing BD of the light-emitting section LM that faces in the direction opposite to the front side FS) along the upper side of the back side BS.

The rotation section RM is rotatably connected to the housing BD through the rotation shaft RP. Specifically, the rotation section RM has a rotation side RS having almost the same size and shape as those of the back side BS of the housing BD. One side of the rotation side RS is connected to the upper side of the back side BS through the rotation shaft RP so that the rotation side RS can be rotated around the rotation shaft RP with respect to the back side BS.

The rotation section RM is connected to the housing BD so that the rotation angle of the rotation section RM with respect to the housing BD can be adjusted. In this embodiment, the housing BD and the rotation section RM are formed of a plastic. The housing BD, the rotation section RM, and the rotation shaft RP are connected so that a large frictional force occurs between the housing BD and the rotation section RM or between the housing BD, the rotation section RM, and the rotation shaft RP when rotating the rotation section RM. In this embodiment, the rotation section RM is maintained by the frictional force against the weight of the rotation section RM so that the rotation angle of the rotation section RM with respect to the housing BD can be adjusted.

FIG. 4B is a side view showing a state in which the light-emitting unit 14 according to the second embodiment is disposed at the top of the display section 12 (gray portion in FIG. 4B). In the placement example shown in FIG. 4B, the light-emitting unit 14 according to this embodiment is disposed on the display section 12 so that the back side BS of the light-emitting section LM comes in contact with the frame surface 15 of the display section 12, the rotation side RS of the rotation section RM comes in contact with the upper side 19 of the display section 12, the holding section CM comes in contact with the upper part of the display section 12, and the weight section WM is positioned on the back side 21 of the display section 12.

In the example shown in FIG. 4B, since the angle formed by the frame surface 15 and the upper side 19 of the display section 12 is 90°, the light-emitting section LM can be disposed along the angle formed by the frame surface 15 and the upper side 19 of the display section 12 in a state in which the angle formed by the back side BS and the rotation side RS is adjusted to 90°. Therefore, the direction of the light-emitting section LM can be stabilized while allowing the front side FS of the light-emitting section LM to face in the direction that intersects the display screen 11 (i.e., the direction toward the player).

Since the weight of the light-emitting section LM is almost the same as the weight of the weight section WM in the same manner as in the first embodiment, the light-emitting section LM and the weight section WM pull the holding section CM downward with almost the same force. A frictional force corresponding to the weight of the light-emitting section LM and the weight of the weight section WM occurs in the contact area with the display section 12 obtained by deformation of the holding section CM. According to this embodiment, the light-emitting unit 14 can be stably disposed on the display section 12 while stabilizing the direction of the light-emitting section LM.

According to this embodiment, since the back side BS and the rotation side RS can be caused to come in contact with a plurality of surfaces or sides of the display section 12 having various types of shape by adjusting the angle formed by the rotation side RS and the back side BS corresponding to the shape of the display section 12, the direction of the light-emitting section LM can be stabilized regardless of the shape of the display section 12.

4. Third Embodiment

The details of a light-emitting unit 14 according to a third embodiment are described below.

Figure 5A:
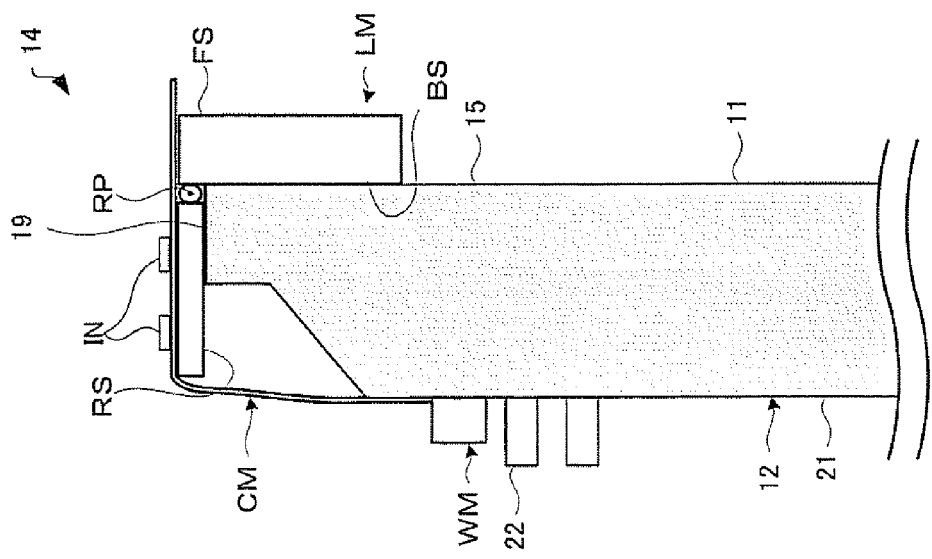
FIGS. 5A to 5C show the appearance and a placement example of a light-emitting unit according to a third embodiment.

FIG. 5A is a perspective view showing the light-emitting unit 14 according to the third embodiment. As shown in FIG. 5A, the light-emitting unit 14 according to this embodiment has almost the same configuration as that of the light-emitting unit 14 according to the second embodiment. In this embodiment, the holding section CM can connect the light-emitting section LM and the weight section WM so that the position of the light-emitting section LM with respect to the holding section CM (distance between the light-emitting section LM and the weight section WM) can be changed.

In this embodiment, six holes HL arranged in one row at equal intervals along the longitudinal direction of the holding section CM are provided in two rows, as shown in FIG. 5A. The rotation section RM has four insertion portions IN that are inserted into the holes HL to connect the holding section CM and the light-emitting section LM.

The insertion portion IN according to this embodiment is formed so that the end of the insertion portion IN has a diameter larger than the diameter of the hole HL and can be inserted into the hole HL while deforming the hole HL in the holding section CM formed of a silicone resin by applying a predetermined force. The end of the insertion portion IN cannot pass through the hole HL after insertion so that the connection state of the holding section CM and the light-emitting section LM can be maintained. In this embodiment, the light-emitting section LM can be removed from the holding section CM by causing the end of the insertion portion IN to pass through the hole HL while deforming the hole HL by applying a force in the direction opposite to that of a force applied when inserting the end of the insertion portion IN.

The holes HL in the holding section CM are disposed corresponding to the arrangement of the insertion portions IN of the rotation section RM. In this embodiment, the four insertion portions IN are inserted into four of the holes HL at the same time to connect the holding section CM and the light-emitting section LM. In this embodiment, the holding section CM can connect the light-emitting section LM and the weight section WM so that the position of the light-emitting section LM with respect to the holding section CM can be changed by changing the holes HL into which the insertion portions IN are inserted.

Figure 5B:
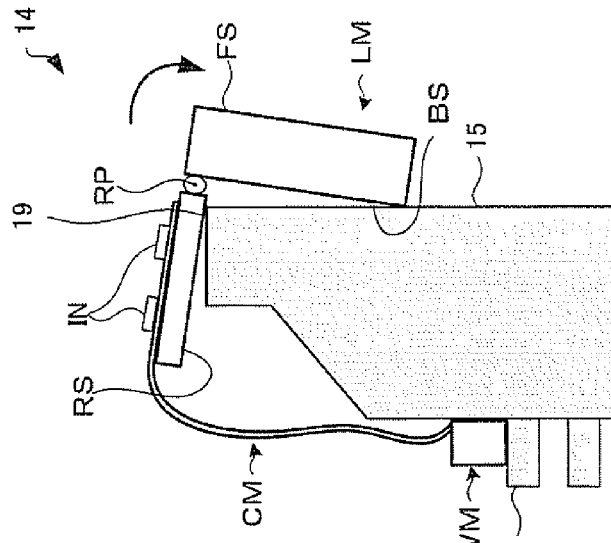

FIG. 5B is a side view showing a state in which the light-emitting unit 14 according to the third embodiment is disposed at the top of the display section 12 (gray portion in FIG. 5B). In the placement example shown in FIG. 5B, the light-emitting unit 14 according to this embodiment is disposed at the top of the display section 12 in the same manner as in the placement example shown in FIG. 4B. In the example shown in FIG. 5B, the display section 12 has a protrusion 22 on the back side 21 of the display section 12. When the weight section WM is placed on the protrusion 22, the weight section WM does not produce a downward force. As a result, since the pulling force of the weight section WM applied to the holding section CM and the pulling force of the light-emitting section LM applied to the holding section CM cannot be balanced, the light-emitting section LM cannot be disposed along the angle formed by the frame surface 15 and the upper side 19 of the display section 12.

Figure 5C:
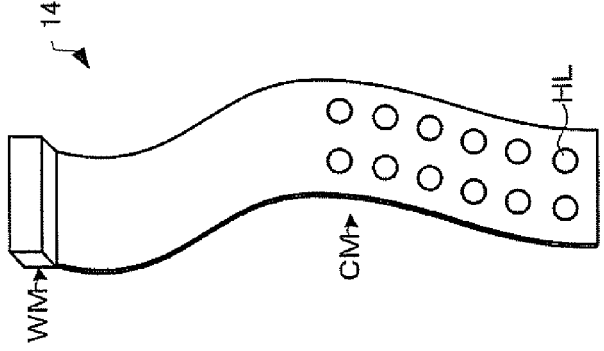

In this embodiment, as shown in FIG. 5C, the position of the light-emitting section LM with respect to the holding section CM (distance between the light-emitting section LM and the weight section WM) is adjusted so that the light-emitting section LM can be disposed along the angle formed by the frame surface 15 and the upper side 19 of the display section 12 while preventing the weight section WM from being placed on the protrusion 22. Therefore, the weight section WM produces a downward force so that the pulling force of the weight section WM and the pulling force of the light-emitting section LM can be balanced. According to this embodiment, the light-emitting unit 14 can be stably disposed on the display section 12 having various types of shape by adjusting the position of the light-emitting section LM with respect to the holding section CM corresponding to the shape of the display section 12 and the like to optimize the balance between the light-emitting section LM and the weight section WM.

In the light-emitting unit 14 according to this embodiment, the holding section CM may be connected to the light-emitting section LM in a state in which the front side shown in FIG. 5A faces the opposite side. In this embodiment, the holding section CM may be configured so that the front side and the back side shown in FIG. 5A differ in coefficient of friction. For example, the coefficient of friction may be changed by changing the materials for the front side and the back side shown in FIG. 5A, or changing the surface shape of the front side and the back side shown in FIG. 5A. According to this embodiment, the holding section CM can be connected to the light-emitting section LM so that either side of the holding section CM comes in contact with the display section 12 corresponding to the surface state of the display section 12.

5. Fourth Embodiment

The details of a light-emitting unit 14 according to a fourth embodiment are described below.

Figure 6A:
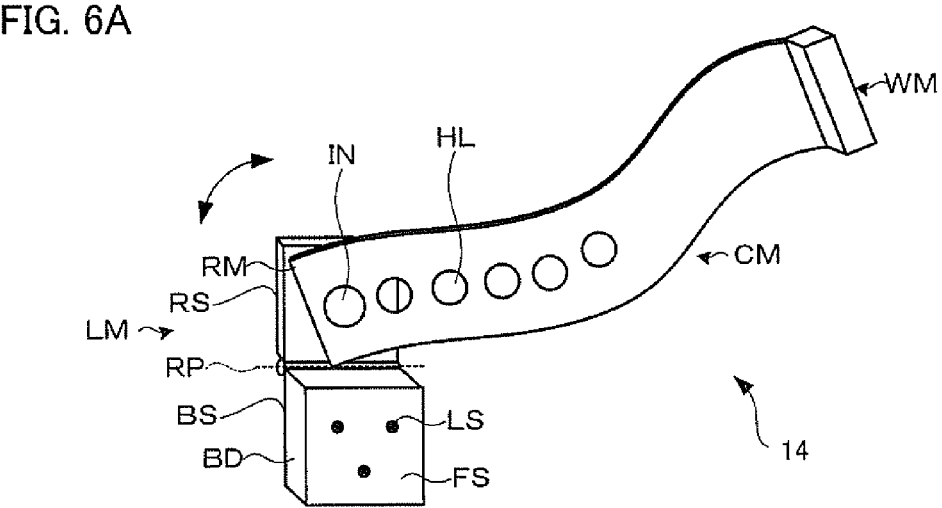
FIGS. 6A to 6C show the appearance and a placement example of a light-emitting unit according to a fourth embodiment.

FIG. 6A is a perspective view showing the light-emitting unit 14 according to the fourth embodiment. As shown in FIG. 6A, the light-emitting unit 14 according to this embodiment has almost the same configuration as that of the light-emitting unit 14 according to the third embodiment. In this embodiment, the holding section CM connects the light-emitting section LM and the weight section WM so that the direction of the light-emitting section LM with respect to the holding section CM can be changed.

In this embodiment, the holding section CM has six holes HL that are arranged in one row at equal intervals along the longitudinal direction of the holding section CM, as shown in FIG. 6A. The rotation section RM has one insertion portion IN that is inserted into one of the holes HL to connect the holding section CM and the light-emitting section LM.

The insertion portion IN according to this embodiment connects the holding section CM and the light-emitting section LM, and allows the light-emitting section LM to be removed from the holding section CM in the same manner as the insertion portion IN according to the third embodiment. As shown in FIG. 6A, the insertion portion IN according to this embodiment is configured so that the direction of the holding section CM with respect to the light-emitting section LM can be changed (see arrows in FIG. 6A) around the insertion portion IN along the surface of the rotation section RM provided with the insertion portion IN in a state in which the holding section CM and the light-emitting section LM are connected.

In this embodiment, the insertion portion IN is inserted into the hole HL so that a large frictional force occurs between the insertion portion IN and the hole HL or between the insertion portion IN, the hole HL, and the rotation section RM when changing the direction of the holding section CM with respect to the light-emitting section LM. According to this embodiment, the direction of the holding section CM with respect to the light-emitting section LM can be adjustably maintained by the frictional force.

Figure 6B:
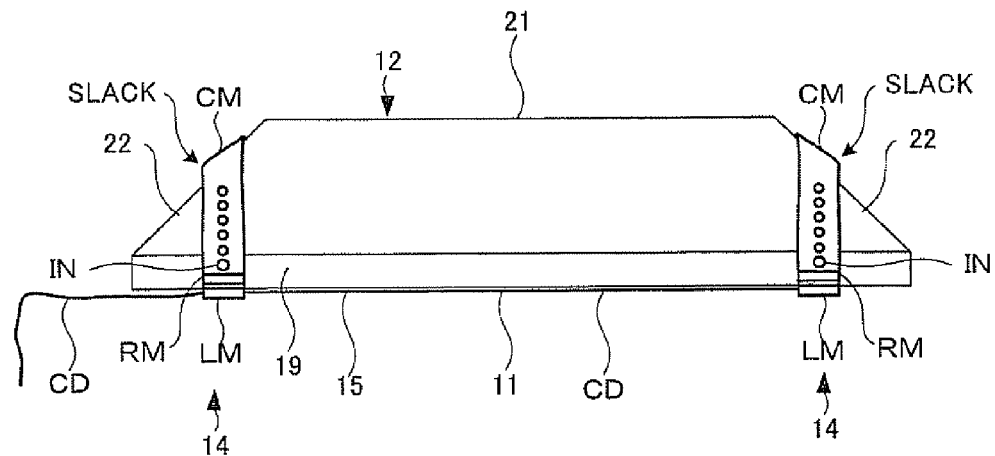

FIG. 6B is a top plan view showing a state in which the light-emitting unit 14 according to the fourth embodiment is disposed at the top of the display section 12. In the placement example shown in FIG. 6B, the light-emitting unit 14 according to this embodiment is disposed on the display section 12 so that the back side BS of the light-emitting section LM comes in contact with the frame surface 15 of the display section 12, the rotation side RS of the rotation section RM comes in contact with the upper side 19 of the display section 12, the holding section CM comes in contact with the upper part of the display section 12, and the weight section WM is positioned on the back side 21 of the display section 12 almost in the same manner as in the placement example shown in FIG. 5B. As shown in FIG. 6B, the light-emitting sections LM of the right and left light-emitting units 14 according to this embodiment are connected via the cord CD for supplying power to the light-emitting sections LM.

The display section 12 in the example shown in FIG. 6B is formed so that the back side 21 of the display section 12 has a truncated pyramid shape (e.g., rear-projection monitor). When the holding section CM comes in contact with a slope 22 that diagonally faces outward with respect to the display screen 11, if the holding section CM is disposed in the direction perpendicular to the display screen 11 (FIG. 6B), the holding section CM becomes slack due to the angle formed by the direction of the holding section CM and the direction of the slope 22. As a result, since the pulling force of the weight section WM applied to the holding section CM and the pulling force of the light-emitting section LM applied to the holding section CM cannot be balanced in the same manner as in the example shown in FIG. 5B, the light-emitting unit 14 cannot be disposed stably on the display section 12.

Figure 6C:
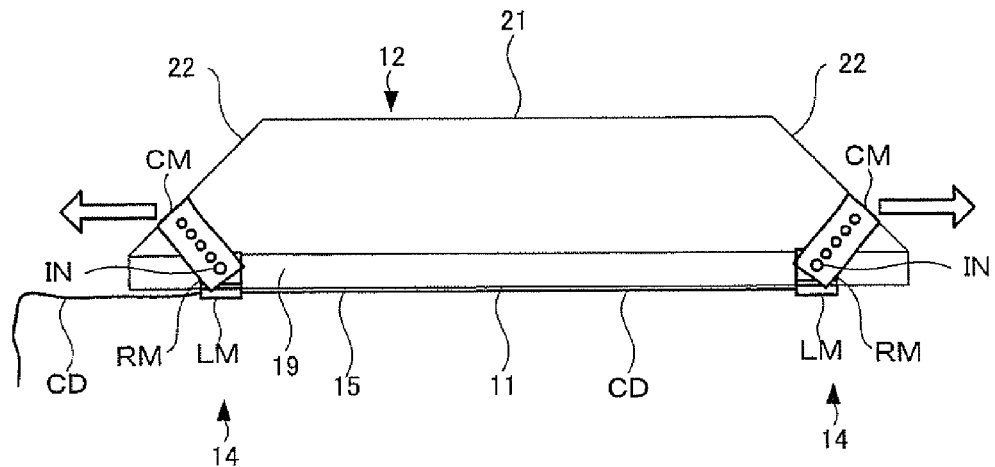

In this embodiment, the direction of the holding section CM with respect to the light-emitting section LM is adjusted, as shown in FIG. 6C, so that the holding section CM is positioned perpendicularly to the slope 22 of the display section 12 while disposing the light-emitting section LM along the angle formed by the frame surface 15 and the upper side 19 of the display section 12, whereby the light-emitting section LM and the weight section WM can be balanced.

In the example shown in FIG. 6C, since the direction of the pulling force of the weight section WM applied to the holding section CM differs from the direction of the pulling force of the light-emitting section LM applied to the holding section CM, a leftward force is applied to the light-emitting unit 14 disposed on the left, and a rightward force is applied to the light-emitting unit 14 disposed on the right. In this embodiment, since the right and left light-emitting units 14 are connected through the cord CD, as shown FIG. 6C, the light-emitting units 14 pull each other through the cord CD. According to this embodiment, even if the back side 21 of the display section 12 has a truncated pyramid shape (e.g., rear-projection monitor), the light-emitting unit 14 can be stably disposed on the display section 12.

According to this embodiment, the light-emitting unit 14 can be stably disposed on the display section 12 having various types of shape by adjusting the direction of the holding section CM with respect to the light-emitting section LM corresponding to the shape of the display section 12 and the like to optimize the balance between the light-emitting section LM and the weight section WM.

6. Configuration of Back Side of Light-Emitting Section

The details of the back side BS of the light-emitting section LM according to the above embodiment are described below.

Figure 7A:
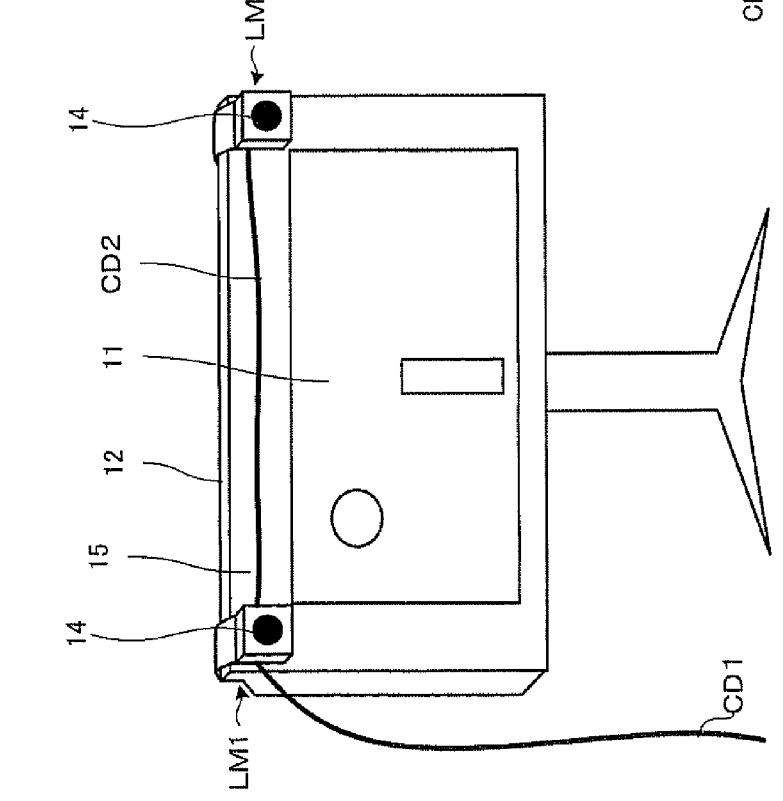
FIGS. 7A to 7C show the back side of a light-emitting section according to the embodiment of the invention.

FIG. 7A is a perspective view showing a state in which two light-emitting units 14 are disposed at the top of the display section 12 (viewed from the front side). As shown in FIG. 7A, the light-emitting units 14 are disposed at the top of the display section 12 on the right and left at a predetermined interval. A cord CD1 from a power supply and a cord CD2 for supplying power to the light-emitting section LM2 of the light-emitting, unit 14 disposed on the right with respect to the display screen 11 are connected to the light-emitting section LM1 of the light-emitting unit 14 disposed on the left with respect to the display screen 11. Specifically, the cord CD1 and the cord CD2 are connected to the light-emitting section LM1. On the other hand, only the cord CD2 is connected to the light-emitting section LM2.

Figure 7B:
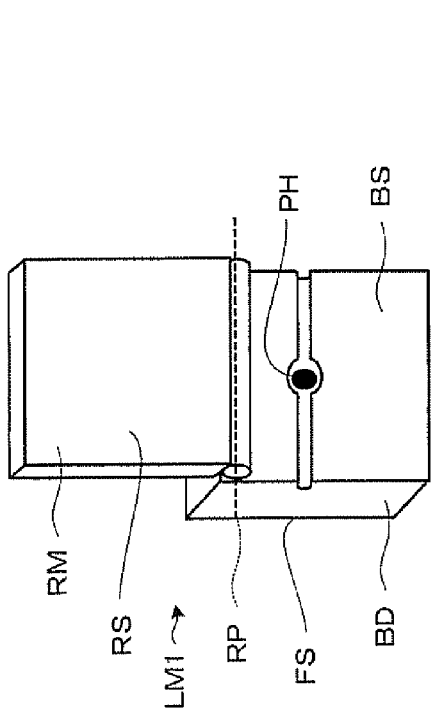

FIG. 7B is a perspective view showing the back side BS of the light-emitting section LM1 connected to the cord CD1 and the cord CD2. As shown in FIG. 7B, a pull-out opening PH and a cord groove CS are formed in the back side BS of the light-emitting section LM1.

The pull-out opening PH is a hole for providing the cord CD1 that supplies power to the light source LS of the light-emitting section LM1 and the cord CD2 that supplies power to the light source LS of the light-emitting section LM2. The pull-out opening PH is provided around the center of the back side BS. In the above embodiment, the pull-out opening PH has a size that allows the cord CD1 and the cord CD2 to pass through, as shown in FIG. 7B.

The cord groove CS is a groove for burying the cord CD1 and the cord CD2 from the pull-out opening PH in the back side BS. The cord groove CS is formed in the back side BS in the rightward and leftward directions from the pull-out opening PH. In the above embodiment, the cord groove CS has a width that can accommodate the cord CD1 or the cord CD2. The width of the cord groove CS is narrower to some extent than the thickness of the cord CD1 or the cord CD2. Therefore, when the cord CD1 or the cord CD2 is fitted into the cord groove CS, the cord CD1 or the cord CD2 is maintained in the cord groove CS in a state in which the cord CD1 or the cord CD2 can be removed from the cord groove CS. Specifically, in the above embodiment, the cord CD1 or the cord CD2 is removably buried in the back side BS by utilizing the cord groove CS.

Figure 7C:
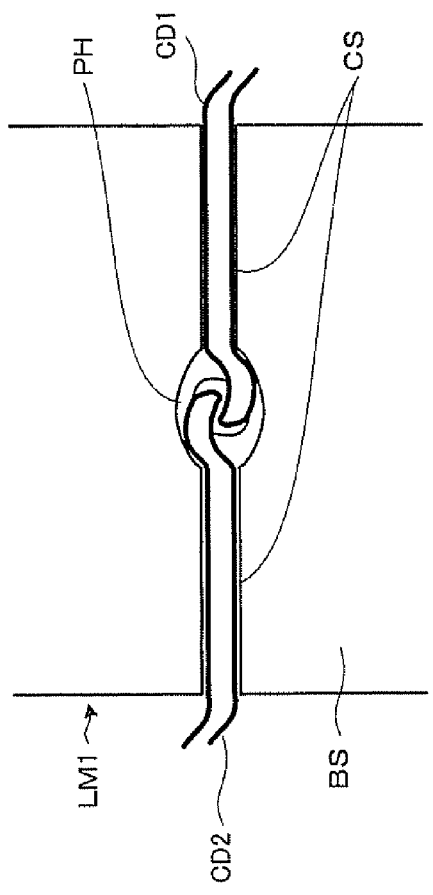

FIG. 7C is an enlarged view showing the back side BS of the light-emitting section LM1. FIG. 7C shows an example in which the cord CD1 pulled out from the pull-out opening PH is provided in the cord groove CS in the rightward direction, and the cord CD2 pulled out from the pull-out opening PH is provided in the cord groove CS in the leftward direction. In the above embodiment, since the cord CD1 or the cord CD1 can be removed from the cord groove CS, the cord CD1 may be provided in the cord groove CS in the leftward direction, and the cord CD2 may be provided in the cord groove CS in the rightward direction, differing from the example shown in FIG. 7C. In the above embodiment, the cord CD1 and the cord CD2 can be provided in the rightward or leftward direction along the back side BS by providing the cord groove CS in the back side BS of the light-emitting section LM1 in the rightward and leftward directions from the pull-out opening PH. According to the above embodiment, the positional relationship (right and left) between the light-emitting section LM1 connected to the cord CD1 and the cord CD2 and the light-emitting section LM2 connected to only the cord CD2 can be appropriately changed.

According to the above embodiment, since the two cords pulled out from the pull-out opening PH are buried in the back side BS in the rightward and leftward directions along the cord groove CS, the back side BS can be caused to adhere to the frame surface 15 of the display section 12 or the like, whereby the direction of the light-emitting section LM can be stabilized.

7. Functional Blocks

Figure 8:
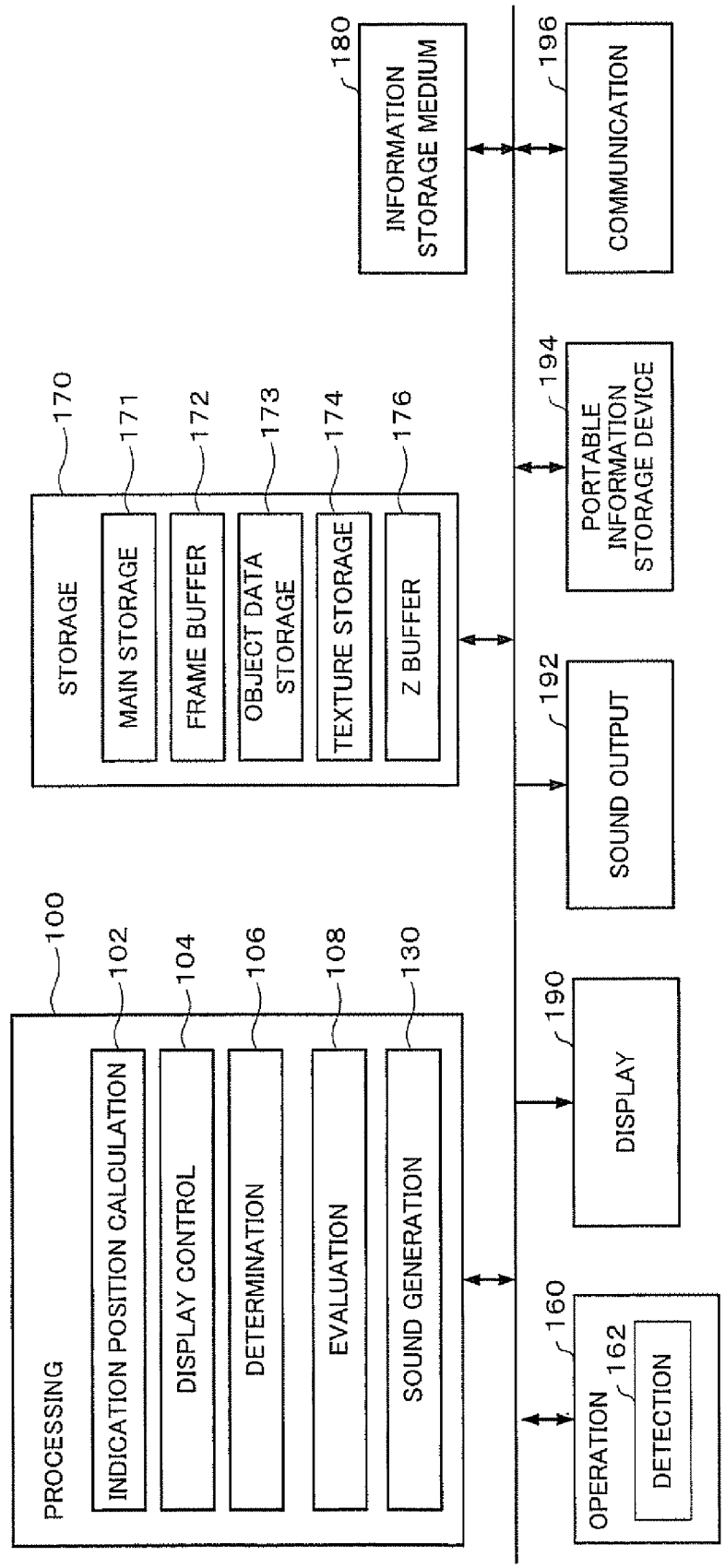
FIG. 8 is a diagram showing an example of functional blocks according to one embodiment of the invention.

The configuration of the indication position calculation system (game system) according to the above embodiment is described below with reference to FIG. 8. FIG. 8 shows an example of a functional block diagram of the indication position calculation system according to the above embodiment. The indication position calculation system according to the above embodiment may have a configuration in which some of the elements (sections) shown in FIG. 8 are omitted.

An operation section 160 allows a player to input operation data. In the above embodiment, the operation section 160 may be an indicator (pointing device) configured so that the player can arbitrarily change the position and the direction of the operation section 160 while holding the operation section 160 and directs the operation section 160 toward an arbitrary position on the indication plane such as the display screen 11. The operation section 160 includes a detection section 162 that detects information which changes corresponding to the movement of the operation section 160. For example, the detection section 162 acquires the relative relationship between the imaging-side reference position and the light reception position of the imaging target using an imaging element (light-receiving element) such as a CMOS sensor or a CCD camera to detect the movement of the operation section 160.

The operation section 160 also includes a button as an operating section for the player to perform an ON/OFF input. The operation section 160 may also include a lever (analog pad), an arrow key, a steering wheel, a microphone, a touch panel display, or the like so that various types of operation data can be input.

A storage section 170 serves as a work area for a processing section 100, a communication section 196, and the like. The function of the storage section 170 may be implemented by a RAM (VRAM) or the like. The storage section 170 according to the above embodiment includes a main storage section 171 used as a work area, a frame buffer 172 that stores the final display image and the like, an object data storage section 173 that stores model data relating to an object, a texture storage section 174 that stores a texture corresponding to each piece of object data, and a Z buffer 176 that stores a Z value when an image of an object is generated. Note that the storage section 170 may have a configuration in which some of these sections are omitted.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like.

A program (data) that causes the processing section 100 to execute various processes according to the above embodiment is stored in the information storage medium 180. Specifically, a program that causes a computer to function as each section according to the above embodiment (program that causes a computer to perform the process of each section) is stored in the information storage medium 180.

A display section 190 outputs an image generated according to the above embodiment. The function of the display section 190 may be implemented by a CRT, an LCD, a touch panel display, or the like. In the above embodiment, the light-emitting unit 14 for calculating the relative positions of the operation section 160 and the display screen 11 of the display section 190 is provided near the display section 190. In the above embodiment, an infrared LED that emits invisible light is used as the light source LS of the light-emitting unit 14.

A sound output section 192 outputs sound generated according to the above embodiment. The function of the sound output section 192 may be implemented by a speaker, a headphone, or the like.

A portable information storage device 194 stores a player's personal data, game save data, and the like. The portable information storage device 194 may be a memory card, a portable game device, or the like.

The communication section 196 performs various types of control for communicating with the outside (e.g., a host device or an image generation system). The function of the communication section 196 may be implemented by hardware such as a processor or a communication ASIC, a program, or the like.

Note that a program (data) that causes a computer to function as each section according to the above embodiment may be distributed to the information storage medium 180 (storage section 170) from an information storage medium included in a host device (server) through a network and the communication section 196. Use of the information storage medium of the host device (server) is also included within the scope of the invention.

The processing section 100 (processor) performs a game process, an image generation process, a sound generation process, and the like based on operation data from the operation section 160, a program, and the like. The game process includes starting the game when game start conditions have been satisfied, proceeding with the game, disposing an object such as a character or a map, displaying an object, calculating game results, finishing the game when game end conditions have been satisfied, and the like. The processing section 100 performs various processes using the storage section 170 as a work area. The function of the processing section 100 may be implemented by hardware such as a processor (e.g. CPU or DSP) or an ASIC (e.g. gate array), or a program.

The processing section 100 according to the above embodiment includes an indication position calculation section 102, a display control section 104, a determination section 106, an evaluation section 108, and a sound generation section 130. Note that the processing section 100 may have a configuration in which some of these sections are omitted.

The indication position calculation section 102 calculates information relating to the indication position of the operation section 160 on the display screen 11 based on the light reception position information relating to the infrared light from the light-emitting units 14 received by the light-receiving sensor 18, and the reference position information set in advance.

The display control section 104 performs a display control process on an object displayed on the display section 190. Specifically, the display control section 112 performs the display control process such as generating an object (e.g., character, background, target, car, ball, item, building, tree, pillar, wall, or map), designating the display position of an object, or causing an object to disappear. Specifically, the display control section 112 performs the display control process such as registering an object which has been generated in an object list, transferring the object list to a drawing section and the like, or deleting an object which has disappeared from the object list. The display control section 104 displays an object indicating the indication position (impact position) on the display screen 11 based on information relating to the indication position of the operation section 160 on the display screen 11.

The determination section 106 determines the positional relationship between the indication position information relating to the operation section 160 on the display screen 11 of the display section 190 and the target object TO based on an operation input using the operating section (trigger) provided in the operation section 160. Specifically, the determination section 106 determines whether or not the indication position has hit (coincided with or reached) the display position of the target object TO based on the indication position information when the operation input using the operating section has been received.

The evaluation section 108 evaluates the operation using the operation section 160 based on the hit determination result. In the above embodiment, the evaluation section 108 evaluates the operation of the operator by means of score calculations and the like when the target object TO has been hit.

The sound generation section 130 performs a sound generation process based on the results of various processes performed by the processing section 100 to generate game sound such as background music (BGM), effect sound, or voice, and outputs the generated game sound to the sound output section 192.

The image generation system according to the above embodiment may be a system dedicated to a single-player mode in which only one player can play a game, or may be a system provided with a multi-player mode in which two or more players can play a game.

When a plurality of players play a game, a game image and game sound provided to the players may be generated using one terminal, or may be generated by a distributed process using a plurality of terminals (game devices or portable telephones) connected via a network (transmission line or communication line), for example.

8. Modification

The methods described relating to the above embodiments are examples. A case of employing a method that achieves effects similar to those of the methods described relating to the above embodiments is also included within the scope of the invention. The invention is not limited to the above embodiments. Various modifications and variations may be made. Various methods relating to the above embodiments and modifications described later may be appropriately used in combination as a method that implements the invention.

For example, the third embodiment has been described taking an example in which the holding section CM connects the light-emitting section LM and the weight section WM so that the position of the light-emitting section LM with respect to the holding section CM can be changed. Note that the holding section CM may connect the light-emitting section LM and the weight section WM so that the position of the weight section WM with respect to the holding section CM can be changed. The holding section CM may connect the light-emitting section LM and the weight section WM so that the positions of the light-emitting section LM and the weight section WM with respect to the holding section CM can be changed.

The third embodiment has been described taking an example in which the four insertion portions IN are inserted into four holes HL at the same time to connect the holding section CM and the light-emitting section LM. In the third embodiment, one insertion portion IN among the four insertion portions IN may be inserted into one hole HL so that the holding section CM connects the light-emitting section LM and the weight section WM so that the direction of the holding section CM with respect to the light-emitting section LM can be changed.

The third embodiment has been described taking an example in which the position of the light-emitting section LM with respect to the holding section CM is adjusted in order to avoid the protrusion 22 on the back side 21 of the display section 12. Note that the position of the light-emitting section LM with respect to the holding section CM is adjusted in order to avoid a wire or an outlet on or in the hack side 21 of the display section 12 in addition to the protrusion 22.

Figure 9A:
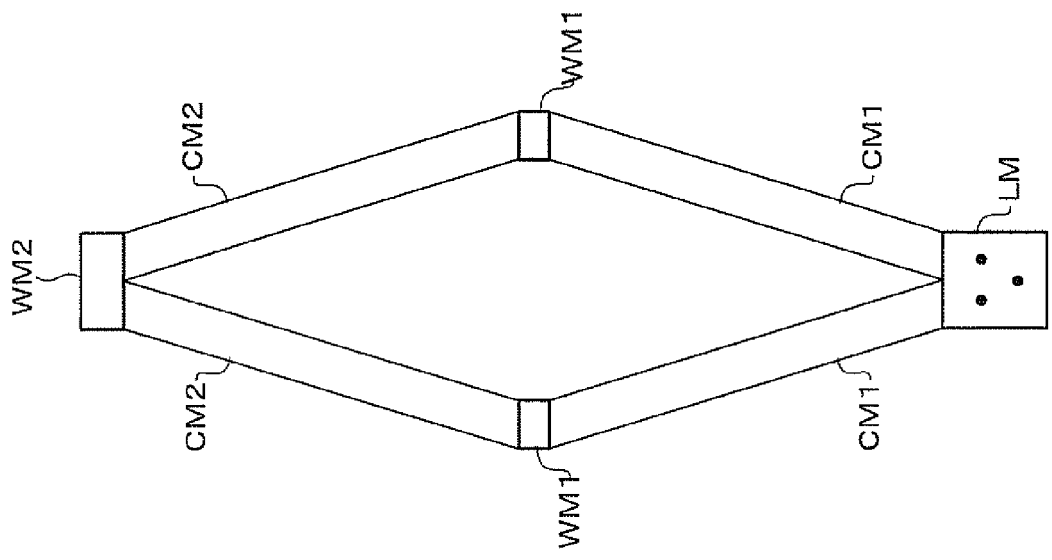
FIGS. 9A to 9C show examples of a light-emitting unit according to a modification of one embodiment of the invention.
Figure 9B:
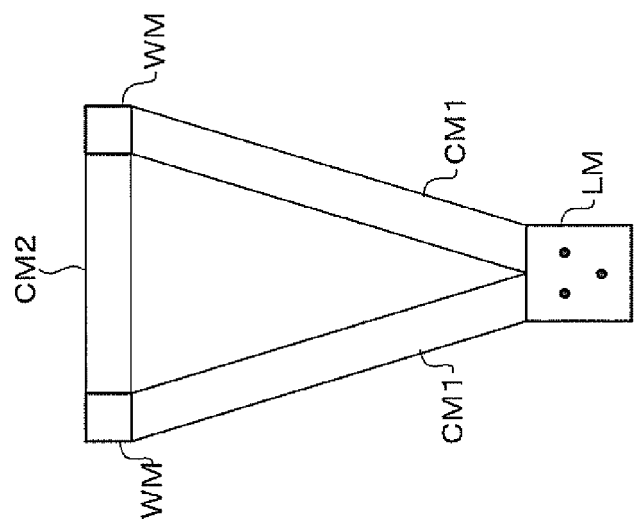
Figure 9C:
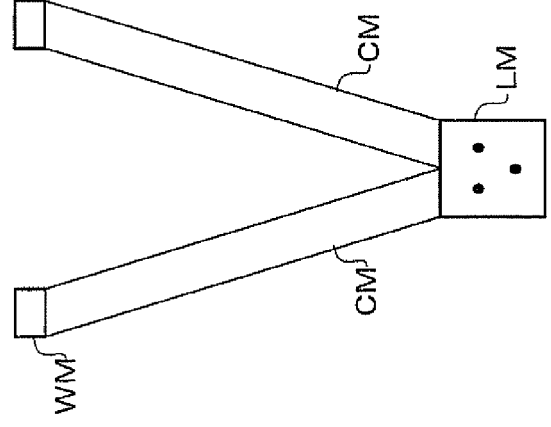

The above embodiments have been described taking an example in which one holding section CM and one weight section WM are provided corresponding to one light-emitting section LM. Note that a plurality of holding sections CM and a plurality of weight sections WM may be provided corresponding to one light-emitting section LM. As shown in FIG. 9A, the light-emitting unit 14 may include two holding sections CM that connect one light-emitting section LM and two weight sections WM, for example. As shown in FIG. 9B, the light-emitting unit 14 may include two first holding sections CM1 that connect one light-emitting section LM and two weight sections WM, and one second holding section CM2 that connects the two weight sections WM. As shown in FIG. 9C, the light-emitting unit 14 may include two first weight sections WM1 connected to the light-emitting section LM, one second weight section WM2 that is not connected to the light-emitting section LM, two first holding sections CM1 that connect the light-emitting section LM and the two first weight sections WM1, and two second holding sections CM2 that connect the two first weight sections WM1 and the second weight section WM2.

Figure 10B:
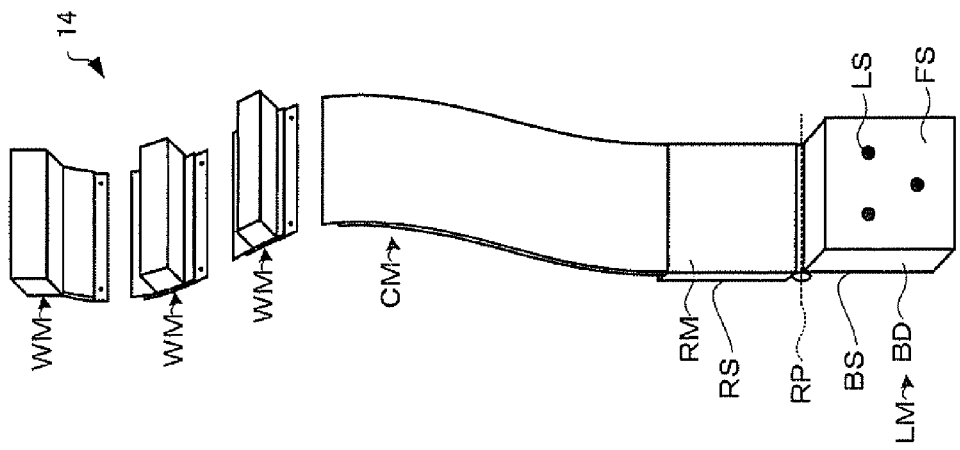
FIGS. 10A and 10B show examples of a light-emitting unit according to a modification of one embodiment of the invention.
Figure 10A:
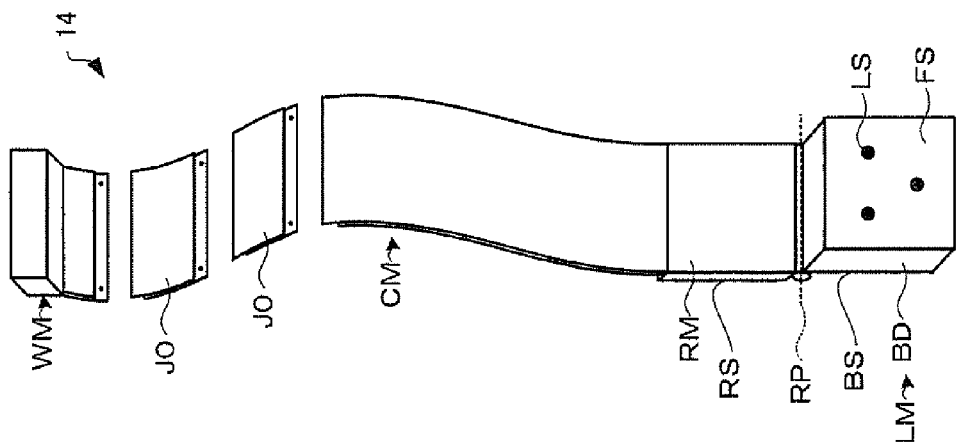

The third embodiment has been described taking an example in which the light-emitting section LM and the weight section WM are connected so that the position of the light-emitting section LM with respect to the holding section CM (distance between the light-emitting section LM and the weight section WM) can be changed. Note that a configuration in which the length of the holding section CM can be adjusted may also be employed. In this case, as shown in FIG. 10A, the holding section CM may be formed using a plurality of link members JO that can be connected, and the length of the holding section CM may be adjusted by changing the number of link members JO to be connected, for example. A configuration in which a plurality of weight sections WM can be connected to the holding section CM may also be employed. In this case, as shown in FIG. 10B, a plurality of weight sections WM that can be connected may be connected to the holding section CM, for example.

The above embodiments have been described taking an example in which the holding section CM connects the light-emitting section LM and the weight section WM. As shown in FIG. 11A, the weight section WM may not be connected to the holding section CM, and only the light-emitting section LM may be connected to the holding section CM. In this case, the holding section CM may be designed to have a length and flexibility that allow the holding section CM to be deformed corresponding to the shape of the display section 12 by the weight of the light-emitting section LM and the weight of the holding section CM while sufficiently increasing the weight of the holding section CM with respect to the light-emitting section LM (e.g., the weight of the holding section CM is made higher than the weight of the light-emitting section LM).

Figure 11B:
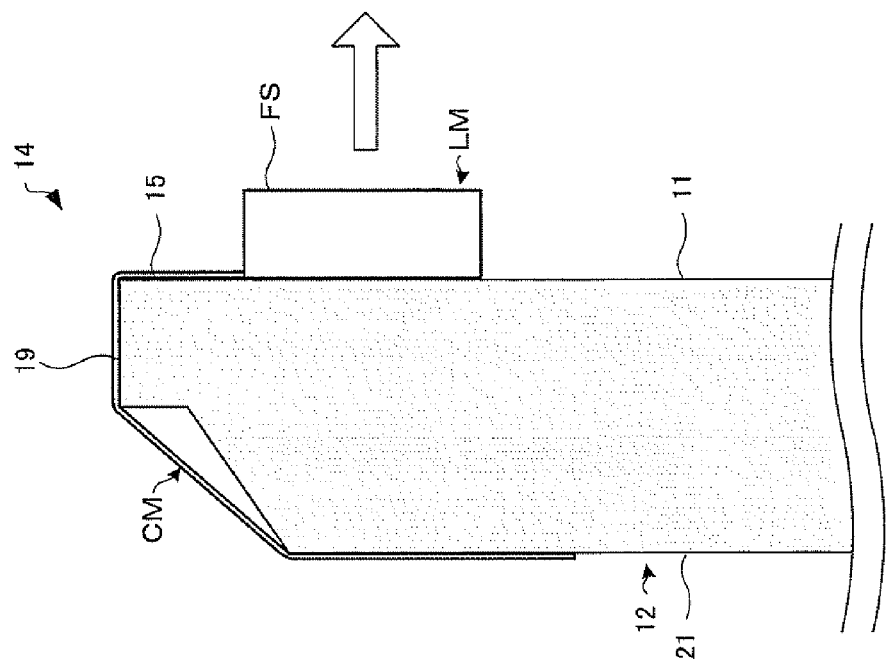
FIGS. 11A and 11B show the appearance and a placement example of a light-emitting unit according to a modification of one embodiment of the invention.
Figure 11A:
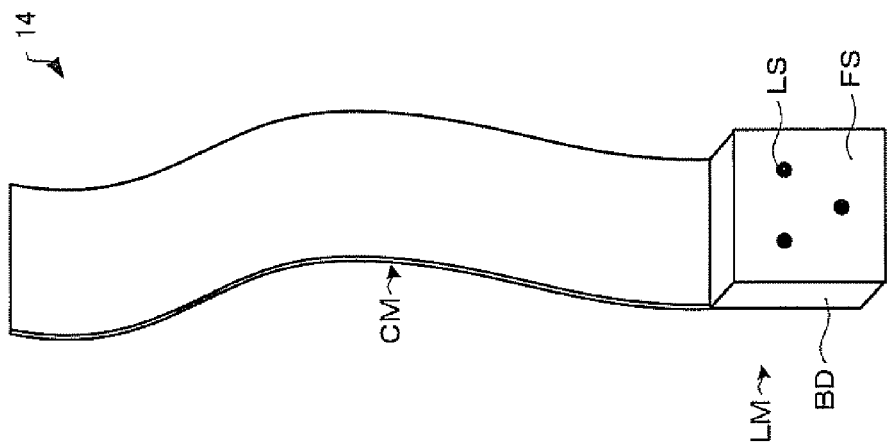

According to this configuration, when the light-emitting unit 14 according to the above embodiment is placed at the top of the display section 12, the light-emitting section LM is suspended in front of the display screen 11 of the display section 12, and the holding section CM is suspended in front of the back side 21 of the display section 12, as shown in FIG. 11B. Since the holding section CM is deformed corresponding to the shape of the display section 12, a contact area with the display section 12 can be obtained. Since the holding section CM according to the above embodiment has a coefficient of friction that ensures that the holding section CM slides on the display section 12 to only a small extent, a frictional force corresponding to the weight of the light-emitting section LM and the weight of the holding section CM occurs in the contact area with the display section 12 obtained by deformation of the holding section CM. Specifically, the light-emitting, unit 14 can be stably disposed on the display section 12 by the frictional force that prevents the light-emitting section LM from sliding downward along the display screen 11 of the display section 12 or the frictional force that prevents the holding section CM from sliding downward along the back side 21 of the display section 12.

According to the above embodiment, the light-emitting section LM can be held on the display screen 11 (e.g., frame surface 15) that intersect the horizontal plane without connecting the weight section WM to the holding section CM, as shown in FIG. 11B.

The invention may be applied to various image generation systems. The above embodiments have been described taking an example of applying the invention to a game system. Note that the invention may also be applied to an indication position calculation system including a presentation system and the like.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. An indication position calculation mark unit disposed on a placement target that has a predetermined positional relationship with an indication surface in order to calculate an indication position of an indicator on the indication surface, the mark unit comprising:
   a mark section that allows light to travel in a predetermined direction;
   a weight section that has a weight substantially equal to a weight of the mark section; and
   a holding section that has a given length, flexibility, and coefficient of friction, and connects the mark section and the weight section, the holding section holding the mark section on a surface parallel to the indication surface by means of a frictional force between the holding section and the placement target based on the weight of the mark section and the weight of the weight section.

2. The mark unit as defined in claim 1, wherein
the holding section connects the mark section and the weight section so that the position of at least one of the mark section and the weight section with respect to the holding section can be changed.

3. The mark unit as defined in claim 1, wherein
the holding section connects the mark section and the weight section so that the direction of the holding section with respect to the mark section can be changed.

4. The mark unit as defined in claim 1, wherein
the length of the holding section can be adjusted.

5. The mark unit as defined in claim 1, wherein
a plurality of weight sections can be connected to the holding section, wherein
a weight of the plurality of the weight sections are substantially equal to the weight of the mark section.

6. The mark unit as defined in claim 1, wherein
the mark section includes:
   a back side facing in a direction opposite to the travel direction of the light;
   a rotation shaft being provided at the top of the back side and parallel to the back side; and
   a rotation section having a rotation side that can be rotated so that a rotation angle around the rotation shaft with respect to the back side can be adjusted, wherein the holding section connects the rotation section and the weight section.

7. The mark unit as defined in claim 1, wherein the mark section includes:
- a back side facing in a direction opposite to the travel direction of the light;
- a pull-out opening provided in the back side, a cord that supplies power to the mark section being pulled out from the pull-out opening; and
- a cord groove provided in the back side in rightward and leftward directions from the pull-out opening, the cord pulled out from the pull-out opening being buried in the back side along the cord groove.

8. An indication position calculation mark unit disposed on a placement target that has a predetermined positional relationship with an indication surface in order to calculate an indication position of an indicator on the indication surface, the mark unit comprising:
- a mark section that allows light to travel in a predetermined direction; and
- a holding section that is connected to the mark section and has a given length, flexibility, and coefficient of friction, the holding section holding the mark section on a surface parallel to the indication surface by means of a frictional force between the holding section and the placement target based on the weight of the mark section and the weight of the holding section.

9. The mark unit as defined in claim 3, wherein the holding section includes a plurality of holes arranged along the longitudinal direction of the holding section, wherein
the rotation section includes insertion portions that can be inserted into one of the plurality of holes of the holding section.

10. The mark unit as defined in claim 6, wherein the holding section includes a plurality of holes arranged along the longitudinal direction of the holding section, wherein
the rotation section includes insertion portions that can be inserted into one of the plurality of holes of the holding section.

11. The mark unit as defined in claim 4, wherein the holding section includes a plurality of link members to adjust the length of the holding section.

12. The mark unit as defined in claim 8, wherein the weight of the holding section extending on a back side of the placement target has a weight substantially equal to a weight of the mark section.

* * * * *